Jan. 26, 1965     E. MARÉ     3,167,076
FILTER TIPPED CIGARETTES
Filed Nov. 22, 1960
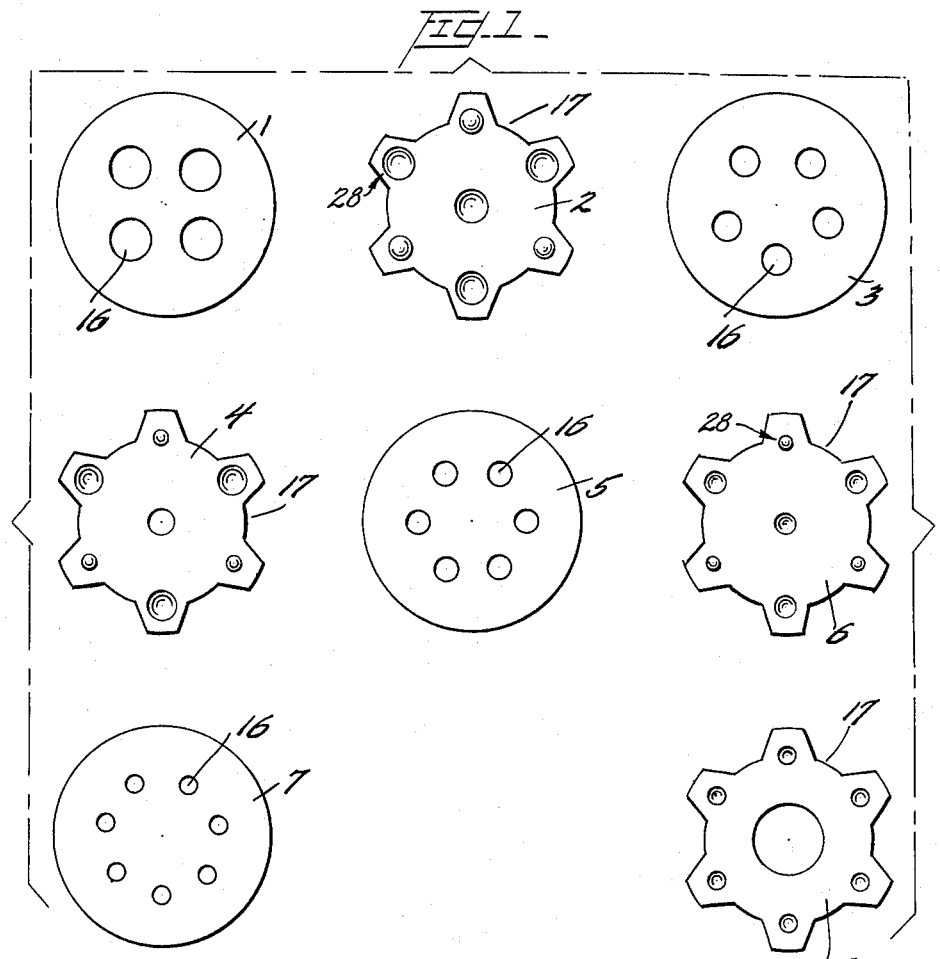
INVENTOR
Ernest Maré
BY Watson, Cole, Grindle & Watson
ATTORNEYS

United States Patent Office 3,167,076
Patented Jan. 26, 1965

---

3,167,076
FILTER TIPPED CIGARETTES
Ernest Maré, Founders Bldg., 34 Ameshoff St., Braamfontein, Johannesburg, Transvaal, Republic of South Africa
Filed Nov. 22, 1960, Ser. No. 71,049
Claims priority, application Republic of South Africa, Dec. 9, 1959, 59/2,196
5 Claims. (Cl. 131—10)

This invention relates to cigarettes having smoke filters for the purpose of removing tars and other constituents deleterious to health, and also to filters suitable for use with cigarettes or pipes.

It can be shown by simple tests that nearly all filters at present in use are not very effective in removing tars and the like from tobacco smoke. The reasons for this are, inter alia, that these filters provide longitudinal passageways through the filter which may be substantially straight or tortuous and through which the smoke can flow. These passageways cannot be restricted in size beyond certain limits for the purpose of increasing filtering efficiency otherwise the filter will offer too great a resistance to flow.

In addition the filters are made of heat insulating material so that they retain a considerable amount of heat thus reducing the tendency for condensation in the filter of volatile constituents of the smoke.

It is generally the object of this invention to provide a filter operating on the cascade impactor principle which by overcoming or reducing the effect of the above mentioned disadvantages will provide improved filtering efficiency.

The cascade impactor acts to remove particles from a gaseous stream by repetitive impingement at increasing velocities of the gas stream onto plates to which particles in the gas stream adhere, the efficiency of collection of the particles increasing with the velocity of impingement on the plates. The gas is also subjected to repetitive deceleration in its passage from one impingement plate to the next projection nozzle or orifice and subsequent repetitive accelleration as it is projected through the nozzles or orifices.

According to this invention there is provided a cigarette having a tip embodying a filter cartridge the latter comprising a cylindrical structure built up of a series of spaced perforated metal plates with the perforations in adjacent plates staggered in relation to each other and the total areas of the perforations in the different plates generally decreasing from the inlet to the outlet of the filter cartridge.

According to a further feature of the invention from the inlet end to the outlet end of the cartridge, the widths of the spaces between adjacent plates alternately increase and decrease but with both the wider and narrower spaces generally decreasing in width.

Still further features of the invention provide for the plates to be housed in a metal cylinder and the latter to be closed at one end by a filter plug.

An example of the invention is illustrated on a very much enlarged scale in the accompanying drawings in which:

FIG. 1 is a plan view of a series of the plates making up the filter, and

FIG. 2 is a sectional side elevation of the plates assembled to form a cartridge with the attachment of the latter to a cigarette indicated by dotted lines.

As shown in FIG. 1 the filter comprises a series of orifice and impingement plates numbered 1 to 8 which are assembled, in the order in which they are numbered, in a cylinder 9 as shown in FIG. 2. The plate 1 on the upstream end 10 of the cylinder 9 is retained in position by an inwardly projecting flange 11 formed at the corresponding end of the cylinder 9. The plate 8, at the downstream end 12 of cylinder 9, is retained in position by a filter plug 13 made of any conventional fibrous or other material. The plug 13 is shorter than the normal filter plug, and the complete filter cartridge including the plug 13 is equal in length to a normal filter plug. It is also attached to a cigarette indicated by dotted lines 14, by a normal cork or other form of wrapper indicated by dotted lines 15.

The cylinder 9, plates 1 to 8 and plug 13 are all disposable items and the cylinder and plates are preferably made from aluminum foil on a suitable automatic machine. The plates 1 to 8 are shown in FIG. 1 as being separate items but a complete series may be formed together and joined by small webs the series then being folded to fit into the cylinder 9 as shown in FIG. 2.

The orifice plates 1, 3, 5 and 7 are in the form of perforated discs the number of perforations 16 increasing and the diameters thereof decreasing in the order in which the plates are numbered. The total area of the perforations in each orifice plate in the series decreases regularly from plate 1 to plate 7 so that the linear velocity of any gases and/or vapours passing through the orifice plates will increase regularly as they pass in turn through each plate.

Vapours passing through the orifice plates 1, 3, 5, and 7 are projected onto the impingement plates 2, 4, 6 and 8 all of which have relatively large circumferential slots 17 which offer little resistance to flow between the slotted portions of the impingement plates and the inner wall of the cylinder 9. The plates 2, 4 and 6 have protrusions or dimples 28 projecting from both faces and it will be noted that the dimples on the downstream side of each impingement plate 2, 4 or 6 is appreciably larger than that on the upstream side. Further the diameters or degree of projection of the corresponding dimples 28 on both sides decreases regularly in the series of plates 2 to 6 from the inlet to outlet side of the cartridge. The impingement plate 8 in contact with the filter plug 3 has dimples 18 only on the upstream side and has a central perforation 19 to facilitate even distribution of smoke through it and into the plug 3.

The dimples 18 act as spacers between the plates and the spacing is related to the velocity of smoke projection through the different orifices 16. As the habits of smokers vary widely particularly regarding the strength of draw and corresponding smoke velocity through the filter, and also the frequency of puffs it is not possible to design a filter which will give, for all smokers, the best balance between resistance to flow through the filter and optimum filtration efficiency. However, a satisfactory balance between these various factors may be obtained with the following dimensions.

| Orifice Plate No. | Total Area of Orifices, mm.$^2$ | Number of Orifices |
|---|---|---|
| 1 | 5.5 | 4 |
| 3 | 4.5 | 5 |
| 5 | 3.5 | 6 |
| 7 | 2.5 | 7 |

Spacing between plates: Mm.
1 and 2 _____ 0.33
2 and 3 _____ 0.67
3 and 4 _____ 0.25
4 and 5 _____ 0.5
5 and 6 _____ 0.17
6 and 7 _____ 0.33
7 and 8 _____ 0.25

It will be noted that there is an alternate increase and decrease in the spaces between the plates 1 to 8 resulting in corresponding velocity variations which will however not be in proportion to the variation in the spacing because considerable cooling of the vapours and gases occurs in the passage thereof through the filter. The higher the flow velocity through the perforations 16 the more closely spaced is the impingement plate onto which the vapours are projected except in the case of the impingement plate 8 which acts mainly to distribute the smoke flow over the whole area of the filter plug. The alternate spaces 18, 19 and 20 are made larger than the spaces between the plates immediately preceding them so as to reduce resistance to flow through these spaces and allow maximum time for cooling.

In use the filter operates basically on the principle of a cascade impactor in that the smoke is caused to impinge directly on the impingement plates 2, 4 and 6 at increasing velocities as it passes through the cartridge. Thus the coarser particles will first be removed from tobacco smoke by the initial impingement plates in the series and the lighter particles by the end plates on which they impinge with increasing velocity thus increasing the collection efficiency. The distribution of the collection over the different plates acts also to materially reduce clogging of the perforations in the orifice plates at the inlet end, and generally to enable the resistance to flow through the cartridge to be reduced to a minimum. Such clogging could occur, if a suitable number of orifice plates were not used, due to agglomeration of solid and vapour particles and also vapour condensation due to increased velocity and consequent pressure reduction as the smoke constituents pass through the perforations 16. The cascade type of passageway through the cartridge also causes a certain amount of agglomeration of particles in the smoke so that any such agglomerated particles passing through the cartridge are more easily caught by the portion of normal filter at the outlet end of the cartridge.

In addition to the above mentioned form of filtration the cartridge being of good conducting material remains relatively cool so that volatile constituents of the smoke or at least the heavier constituents are also cooled and condense on the plates, the cylinder and in the filter plug 3.

The impingement plates may if desired be given a sticky coating of a material such as glycerine to improve collection but generally it has been found that using aluminum foil plates this is not necessary as the smoke particles adhere strongly to the plates.

The perforations in the orifice plates 1, 3, 5 and 7 need not necessarily be round and may for example be in the form of slots. Also while the best results have been obtained with a regular decrease in the total areas of the perforations in the series of orifice plates this is not essential to obtain satisfactory results as long as the orifices in the plates in the series generally decrease in area from the inlet to the outlet end of the cartridge. Thus for example a plate 3 may be substituted by a second plate 5 or vice versa.

It will be obvious that the filter in accordance with the above description may be fitted in a pipe stem as a disposable item.

What I claim as new and desire to secure by Letters Patent is:

1. A cigarette embodying a filter cartridge the latter consisting of a cylindrical structure comprising an assembly of metal plates, an inlet and outlet end to said cylindrical structure, spacers between the adjacent plates generally decreasing in effective length from the inlet to outlet end of the cylindrical structure and said plates having perforations therethrough with the perforations in adjacent plates staggered in relation to each other and the total areas of the perforations through the plates generally decreasing from the said inlet to the said outlet end of the cylindrical structure.

2. A cigarette embodying a filter cartridge the latter consisting of a cylindrical structure comprising an assembly of metal orifice plates and interposed impingement plates with means to provide spaces between the adjacent orifice and impingement plates, the space on the outlet side of each orifice plate being narrower than the space on the inlet side thereof, and perforations through said plates with the perforations in adjacent plates staggered in relation to each other and the total areas of the perforations in the orifice plates generally decreasing from the inlet to the outlet end of the cylindrical structure.

3. A filter cartridge for use with a cigarette or pipe comprising a metal cylinder, an open inlet and outlet end to said cylinder, spaced adjacent co-axial metal plates in the cylinder, spacers between adjacent plates generally decreasing in effective length from the inlet to the outlet end of the cylindrical structure, and said plates having perforations therethrough with the perforations in adjacent plates staggered in relation to each other, and the total areas of the perforations through the plates generally decreasing from the inlet to the outlet end of the cylinder.

4. A filter cartridge for use with a cigarette or pipe comprising a metal cylinder, an open inlet and outlet end to said cylinder, spaced adjacent co-axial metal plates in the cylinder, an inwardly directed flange at one end of the cylinder and a porous filter plug at the other end thereof with the plates retained between the flange and plug, spacers between adjacent plates generally decreasing in effective length from the inlet to the outlet end of the cylindrical structure, and perforations through the plates with the perforations in adjacent plates staggered in relation to each other, and the total areas of the perforations through the plates generally decreasing from the inlet to the outlet end of the cylinder.

5. A filter cartridge for use with a cigarette or pipe comprising a metal foil cylinder, a flange at one end of the cylinder and a porous plug at the other end thereof, alternate co-axial metal foil orifice and impingement plates retained in the cylinder between the flange and plug with the impingement plates having circumferential slots therein and orifices in the orifice plates, said orifices overlapped by the impingement plates, spacers between the adjacent plates generally decreasing in effective length from the inlet to the outlet end of the cylinder, the total areas of the orifices in the orifice plates generally decreasing and the number of said orifices generally increasing from the inlet to the outlet end of the cylinder.

References Cited in the file of this patent

UNITED STATES PATENTS

| 1,743,698 | Walker | Jan. 14, 1930 |
| 1,983,926 | Zirmer | Dec. 11, 1934 |
| 2,387,381 | Zuckerman | Oct. 23, 1945 |
| 2,919,699 | McCormick | Jan. 5, 1960 |
| 2,954,782 | Lebert | Oct. 4, 1960 |

FOREIGN PATENTS

| 583,948 | France | Nov. 24, 1924 |
| 23,822 | Great Britain | 1905 |
| 7,227 | Great Britain | 1911 |
| 506,238 | Great Britain | May 24, 1939 |
| 522,764 | Italy | Apr. 12, 1955 |